Feb. 24, 1942.  J. H. SMITH  2,274,007
BORING TOOL
Filed Jan. 19, 1938
Fig. 1
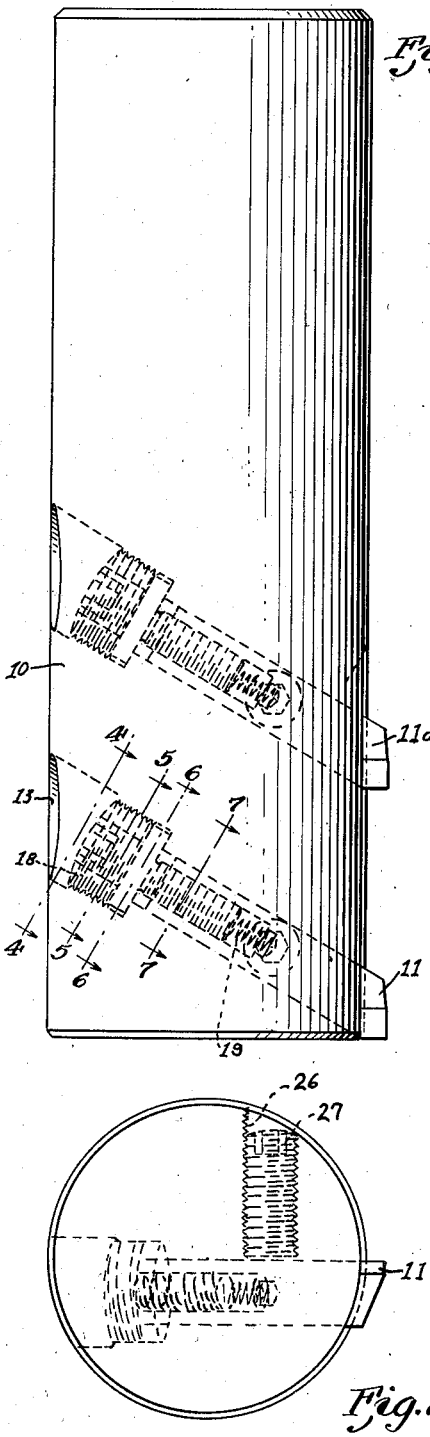
Fig. 2
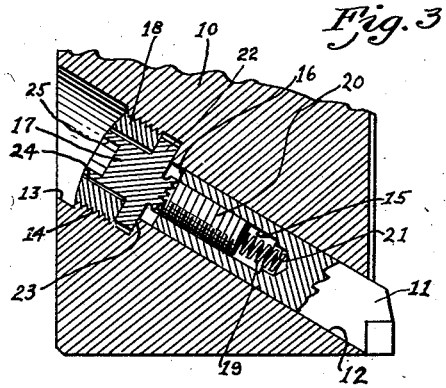
Fig. 3
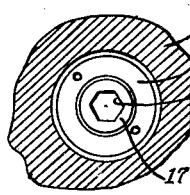
Fig. 4
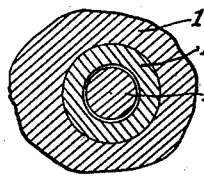
Fig. 5
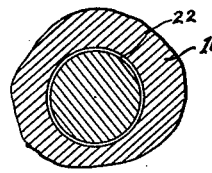
Fig. 6
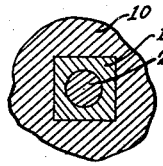
Fig. 7
INVENTOR.
J. Hugo Smith
BY
Barnes, Kisselle, Laughlin & Laird
ATTORNEYS Patented Feb. 24, 1942

2,274,007

UNITED STATES PATENT OFFICE 2,274,007

BORING TOOL

J. Hugo Smith, Detroit, Mich., assignor to Wesson Company, Detroit, Mich., a corporation of Michigan Application January 19, 1938, Serial No. 185,642

5 Claims. (Cl. 77—58)

This invention relates to a boring tool and has particularly to do with a specific improvement relating to the adjustment of said tools.

In a reamer or boring tool which comprises a shaft having transverse or inclined openings for receiving and holding cutters, it has been common to provide means for adjustably arranging these cutters in the holders. Prior to the present invention some of these means have consisted of nuts which are set at a predetermined point in a threaded cutter opening so that the square end of the cutter will abut the nut and be held in this position by a set screw acting on the cutter. These devices have proved unsatisfactory since there is no means for positively moving the cutters in and out and these adjusting screws have been thrown out of adjustment by the chattering or vibration of the tool so that the cutter slips on the set screw.

Another attempt to improve on boring tools has been to provide threads on one side of opposed horizontal cutters so that they may be positioned adjacent screws set in the boring tool and moved in or out by rotation of the screws, a locking means being provided for the cutters. This holding and adjusting means has proved unsatisfactory since it has been found impossible to obtain a rough cut without considerable chattering. Still other attempts to solve this problem have consisted in tapping the non-cutting end of the cutter and abutting the outer end of a bolt, held in said tap, against shoulders formed in the cutter opening. This device is subject to the same criticism as the first device above described.

The object of the present invention is to provide a boring tool which, for the first time, successfully solves this cutter adjustment problem. It is the object of this invention to provide an adjustment arrangement for a cutter whereby the cutter may be positively moved in or out of the boring tool shaft at the will of the operator, but which is not affected by any amount of vibration of the tool. This positive adjustment, in both directions, of the cutter is extremely important in present day production where precision duplication of parts has become such an important part of manufacturing. With the present invention the cutter is always solidly backed by the adjustment parts and yet the actual adjustment step may be performed much more quickly and accurately than with any previous device. It is necessary that these cutters have a very close fit with the tool so that they do not slip easily. It has been the practice in the past to move the cutter out of the tool by a screw and to move it in by tapping it with a soft hammer. I have devised a device whereby the cutter may be moved in or out with all play in the adjustment eliminated.

Other objects and features of the invention have to do with the means for providing a self-locking adjustment device and other details of structure as will be brought out in the following specifications and claims.

A modification of the invention is illustrated, for purposes of exemplification, in the accompanying drawing, in which:

Fig. 1 is an assembly view of a boring tool showing cutters in position.

Fig. 2 is an end view of the assembly.

Fig. 3 is a cross-sectional view illustrating the details of the device.

Figs. 4, 5, 6 and 7 are cross-sections taken on corresponding lines of Fig. 1.

Referring to the drawing, a cutter shaft for a reamer or boring tool is designated 10, and a cutter 11 is slidably positioned in an inclined cutter opening 12 formed in the shaft 10. The cutter opening 12 is enlarged at the top portion 13 to provide a space for an adjustment means for the cutter. This opening 13 is provided with threads 14 which extend to within a short distance of the bottom of the enlargement 13. The cutter 11 is provided with a threaded tap 15 in its non-cutting end 16.

The adjustment and retaining means for the cutter 11 consists of a bolt 17, a nut 18, and a spring 19. The bolt 17 is provided with a threaded shank portion 20 adapted to thread into the opening 15 behind the spring 19 which is fitted into a small tap 21 in the lower end of the top 15 of the cutter. The head of the bolt 17 has a flange 22 larger in diameter than the cutter opening 12 and adapted to be received by the enlargement 13. This flange 22 rests, therefore, on shoulders 23 formed between the opening 12 and the enlargement 13. The retaining nut 18 is threaded into the enlargement to hold the flange and, consequently, the bolt in position. The nut 18 is provided with a hole 24 through which extends the top of the bolt 17. In the top of the bolt 17 is a recess 25 which is adapted to receive a key for turning the bolt.

A set screw opening 26 (Fig. 2) communicates with the opening 12 for the cutter and a countersunk set screw 27 is disposed in this opening for contacting and aiding to lock the cutter 11.

In Fig. 1, a second cutter 11a is located above the cutter 11 and, since this is the same as the cutter 11, it will not be described in detail.

In the operation of the boring tool, it will be seen that the cutter 11 may be accurately adjusted by inserting the key in the opening 25 of the bolt 17 and turning the bolt in either direction. When once mounted in the shaft 10, the adjusting parts 17 and 18 are intended to remain in place in the recess provided for them. In mounting a cutter, the spring 19 may be dropped into the recess 15 and the cutter may then be inserted in the opening 12 and the bolt 18 turned until the cutter is in the position desired. At this time the set screw 27 can be tightened into the recess 26 to lock the cutter 11 in position.

It will be seen that, during the operation of the cutter, there are two means which hold the adjusting bolt 17 in the exact position in which it was placed by the operator. One of these means is the set screw 27, which, while holding the cutter 11, will also hold the bolt 17. In addition, the spring 19 by exerting pressure against the lower end of the bolt 17 will prevent the vibration of the boring tool from turning the bolt in either direction. In actual tests it has been found that the present invention has permitted much more delicate adjustments of the cutter than ever before has been possible. One reason for this is that the bolt 17 remains in the position in which it is turned regardless of the vibration. Because of the design of the bolt 17 and the retaining nut 18, it has been possible to eliminate any play in the adjustment of the cutters. With the applicant's arrangement it is no longer necessary to tap the cutter back into the tool with a hammer. This is distinctly advantageous since with the new tungsten carbide tools it has been found that even slight shocks on the cutting end have resulted in breakage.

What I claim is:

1. In a boring tool, a cutter shaft having a cutter opening comprising a cutter recess and an adjoining threaded recess aligned therewith, a cutter slidably disposed in said cutter recess and having a threaded tap in its non-cutting end, an adjustment bolt having a flange arranged to bear on an annular shoulder in said threaded recess and a threaded shank for cooperating with said tap, and a retaining nut threaded into said threaded recess for holding said flange therein to eliminate any play in the adjustment of the cutter.

2. In a boring tool, a cutter shaft having a cutter opening comprising a cutter recess and an adjoining threaded recess aligned therewith, a cutter slidably disposed in said cutter recess and having a threaded tap in its non-cutting end, an adjustment bolt having a flange arranged to bear on an annular shoulder in said threaded recess and a threaded shank for cooperating with said tap, a retaining nut threaded into said threaded recess for holding said flange therein to eliminate any play in the adjustment of the cutter, and a spring in said tap adapted to bear against said threaded shank.

3. In a boring tool, a cutter shaft having a cutter opening comprising a cutter recess, a cutter slidably disposed in said cutter recess, and manually operable means in said shaft behind, and cooperating with, said cutter for positively moving the same in or out of said cutter recess to set position, and resilient means cooperating with said manually operable means for retaining the same in set position.

4. In a boring tool, a cutter shaft having a cutter opening comprising a cutter recess and an adjoining enlargement aligned therewith, a cutter slidably disposed in said cutter recess, manually operable means retained in said enlargement and cooperating with said cutter for positively moving the same in or out of said cutter recess to a set position, and an expanding spring cooperating with said manually operable means for retaining the same in set position.

5. In a boring tool, a cutter shaft having a cutter opening comprising a cutter recess and an adjoining threaded recess aligned therewith, a cutter slidably disposed in said cutter recess, manually operable means cooperating with said cutter for positively moving the same in or out of said cutter recess to set position, and resilient means acting on said cutter and said manually operable means for maintaining said means in a set relative position.

J. HUGO SMITH.